United States Patent Office

2,864,850
Patented Dec. 16, 1958

2,864,850
METHOD FOR PREPARING 1,1-DICYANO ETHYL SUBSTITUTED 1,3-DIKETONES

Jerome C. Westfahl, Cuyahoga Falls, Ohio, assignor to The B. F. Goodrich Company, New York, N. Y., a corporation of New York No Drawing. Continuation of application Serial No. 523,124, July 19, 1955. This application April 15, 1957, Serial No. 652,655

17 Claims. (Cl. 260—464)

This invention relates to a method of forming derivatives of dicarbonyl compounds having 1,1-dicyano ethyl groups as substituents and more particularly pertains to a method of preparing 1,3-dicarbonyl compounds having at least one 1,1-dicyano ethyl group replacing an active hydrogen atom of the methylene group by reaction of the 1,3-diketone with monomeric 1,1-dicyano ethylene in the absence of a catalyst.

It is known that compounds with an active methylene group can be reacted, in the presence of strong basic catalysts, to form derivatives in which one or both hydrogen atoms of the methylene group are replaced with an aliphatic substituent. Classical examples of such a reaction are the so-called Michael condensation in which a compound containing an active methylene group is reacted with acrylonitrile in the presence of a strongly alkaline catalyst to form a cyano ethyl substituted methylene derivative. In the absence of a catalyst the reaction either does not proceed or the yields are of a very low order even if the reactants are allowed to remain in contact with each other over extended periods of time.

A base-catalyzed reaction between monomeric 1,1-dicyano ethylene and active methylene compounds is not possible, because the 1,1-dicyano ethylene polymerizes very rapidly under such reaction conditions, even in the presence of an inert diluent, such as a liquid hydrocarbon. Monomeric 1,1-dicyano ethylene is so reactive that the presence of almost any ion, water, alcohol or amine will cause polymerization of the monomer.

An object of the invention is the provision of a method for preparing 1,1-dicyano ethyl substituted 1,3-dicarbonyl compounds by reacting the latter with monomeric 1,1-dicyano ethylene in the absence of a catalyst.

Another object is the provision of a method of reacting monomeric 1,1-dicyano ethylene with 1,3-dicarbonyl compounds in the absence of a catalyst at elevated temperatures to form substituted derivatives.

Numerous other objects will be apparent from the following detailed disclosure which describes the preferred embodiment of the invention.

The above objects are accomplished by reacting monomeric, homopolymer-free, 1,1-dicyano ethylene with a 1,3-dicarbonyl compound having the generic structure $$R-\overset{O}{\underset{\|}{C}}-CH_2-\overset{O}{\underset{\|}{C}}-R'$$

in which R represents an alkyl, aryl, aralkyl or alkaryl saturated hydrocarbon or halogenated derivatives thereof and R' represents an alkyl, aryl, aralkyl, alkaryl and alkoxy group or halogenated derivatives thereof.

Specific aliphatic 1,3-dicarbonyl compounds which will react with monomeric, polymer-free, 1,1-dicyano ethylene include:

$$CH_3-\overset{O}{\underset{\|}{C}}-CH_2-\overset{O}{\underset{\|}{C}}-CH_3 \text{ to } C_{18}H_{37}$$

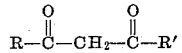

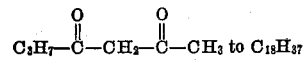
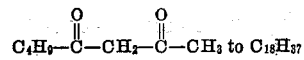
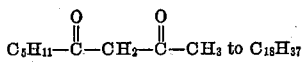
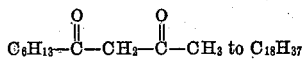
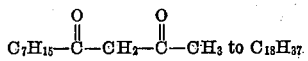
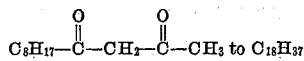
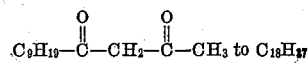
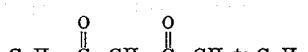
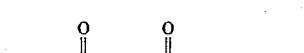
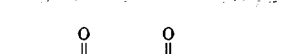
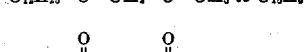
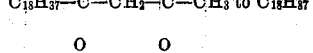
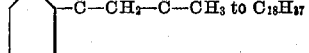
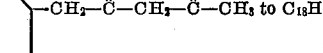
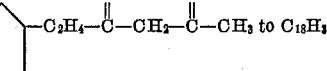
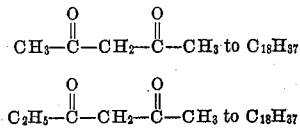

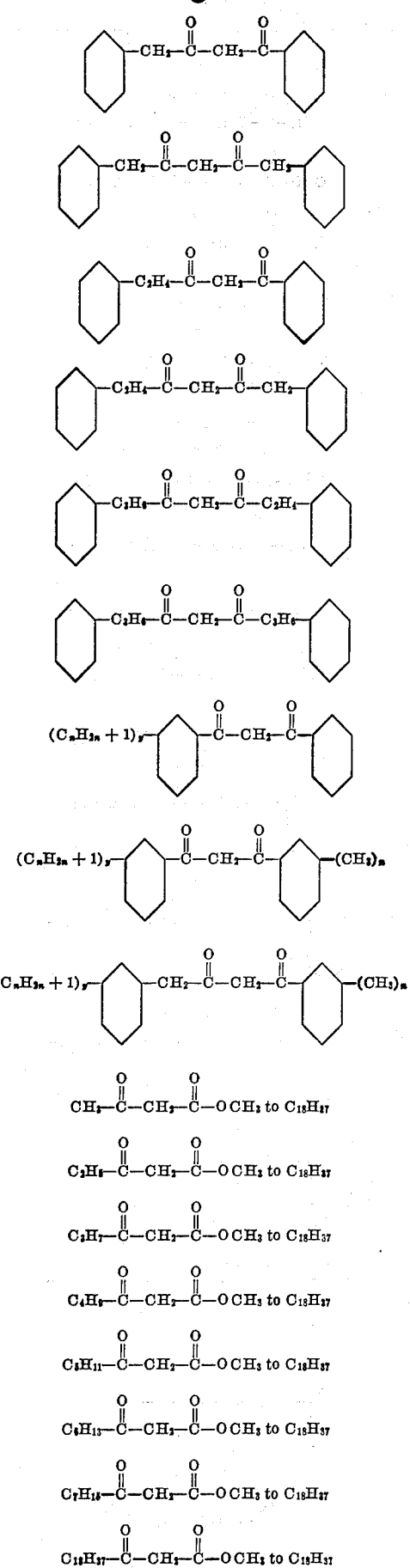

In the above formulas $n$ represents an integer from 1 to 6 and $y$ represents an integer from 1 to 3.

In addition to the 1,3-dicarbonyl compounds specified above, the halogenated derivatives will also react to form 1,1-dicyano ethyl substituted derivatives.

The reaction will proceed slowly at room temperature, but it is preferred to use an elevated temperature of about 100–120° C. or higher, since the reaction rate at the elevated temperatures is markedly greater than that at lower temperatures.

The reaction between 1,3-dicarbonyl compounds and 1,1-dicyano ethylene can be carried out either in the presence or absence of an inert diluent. If the 1,3-dicarbonyl compound is liquid at room temperature or slightly above, I prefer not to use any diluent or solvent, but with 1,3-dicarbonyl compounds which are solid at room temperature it is preferable to employ an inert diluent in which both the 1,1-dicyano ethylene and the 1,3-dicarbonyl compounds are soluble. Solvents for the reaction system include the saturated halogenated aliphatic hydrocarbons such as chloroform, carbon tetrachloride, tetrachloroethylene etc., or the liquid aromatic hydrocarbons such as benzene, toluene, xylene etc. Monomeric 1,1-dicyano ethylene will react with a wide variety of mono-unsaturated compounds to form copolymers and with conjugated dienes to form Diels-Alder type adducts; and for these reasons when a diluent is used it is essential that it be non-reactive.

A further essential condition is that the 1,1-dicyano ethylene is free of any homopolymer of the 1,1-dicyano ethylene, because even small amounts of the homopolymer appear to catalyze further polymerization of the 1,1-dicyano ethylene and thereby make the 1,1-dicyano ethylene unavailable for reaction. If desired, polymerization inhibitors such as $P_2O_5$ can be optionally added to the reaction mixture without interfering with the main reaction course.

The following examples are intended to be illustrative of the invention and are not intended to be construed as limitations thereon. In all instances parts are expressed by weight unless otherwise specified.

*Example 1*

Ethyl acetoacetate was added to a three necked flask to which a reflux condenser, a stirrer and a separatory funnel were connected. The ethyl acetoacetate was heated to 100–110° C. and a solution of freshly distilled monomeric 1,1-dicyano ethylene in ethyl acetoacetate was slowly added to the flask. The reaction temperature of 100° C.–110° C. was maintained until the characteristic odor of monomeric 1,1-dicyano ethylene was absent The ratio of the total ethyl acetoacetate to 1,1-dicyano ethylene was about 4 to 1. The reaction product

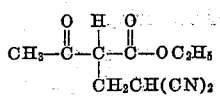

was recovered in a 70% yield, as a colorless liquid with a boiling point of 117–124° C. at 0.2 mm. pressure, a refractive index at 23.7° C. of 1.4601 and a density of 1.133 at $\frac{20°C.}{4°}$.

This liquid 1,1-dicyano ethyl derivative of ethyl acetoacetate was recovered from the reaction mixture by distilling off the unreacted excess ethylacetoacetate under reduced pressure at 50–60° C. and then distilling the end product of the reaction at a pressure of 0.01 mm. and a temperature of 110–116° C.

The liquid derivative was analyzed for carbon, hydrogen and nitrogen with the following results.

|  | C | H | N |
|---|---|---|---|
| Calculated for $C_{10}H_{12}O_3N_2$ | 57.68 | 5.81 | 13.46 |
| Found | 57.39 | 5.70 | 13.40 |
|  | 57.28 | 5.77 | 13.27 |

The 2(1,1-dicyano ethyl) ethyl acetoacetate was hydrolyzed by refluxing with aqueous HCl for 5 hours. Gamma-acetylbutyric acid was isolated in a 77.4% yield from the hydrolysis mixture. The gamma-acetylbutyric acid was converted to its semi-carbazone which had a M. P. of 173° C., with decomposition, and to its oxime which had a M. P. of 103.5–104.5° C. These compounds compare favorably with the reported values of 173–174° C. and 104–105° C. for the semi-carbazone and oxime, respectively.

*Example II*

The general procedure described under Example I was followed with the exception that acetylacetone was used in place of the ethyl acetoacetate. A yield of 63.7% of a solid having a melting point of 101–104.5° C. was recovered.

On analysis the following percentages were found:

|  | C | H | N |
|---|---|---|---|
| Calculated for $C_9H_{10}O_2N_2$ | 60.66 | 5.66 | 15.72 |
| Found | 60.58 | 5.71 | 15.72 |

The solid

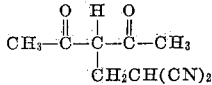

was hydrolyzed by refluxing in aqueous HCl for 3 hours. Extraction of the hydrolysis mixture gave a 68% yield, based on the 1,1-dicyano ethylene, of impure gamma-acetylbutyric acid which had an odor of acetic acid. A semi-carbazone of the impure keto acid had a M. P. of 173.5° C. and the melting point of a mixture of this semi-carbazone with an authentic semi-carbazone of gamma-acetylbutyric acid was not depressed.

*Example III*

To a solution of dibenzoyl methane in dry chloroform was added a chloroform solution of freshly distilled 1,1-dicyano ethylene. The molar ratio of dibenzoyl methane to 1,1-dicyano ethylene was 1 to 2. The reaction was maintained at reflux until the odor of monomeric 1,1-dicyano ethylene was no longer detectable. A solid, recovered from the reaction, was found to be a mixture of

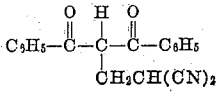

and

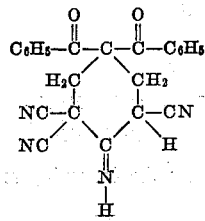

The mono- and the bis-substituted dibenzoyl methanes can be separated by their differences in solubility in several organic solvents. By way of example the mono-substituted dibenzoyl methane is readily soluble in benzene while the bis-substituted derivative is practically insoluble. The M. P. of the mono-substituted derivative was 114.5–115.5° C. and that of the disubstituted compound was 175.5–177° C. with decomposition. The formation of the bis-substituted derivative could not be prevented by using an excess of dibenzoyl methane in the reaction mixture.

Hydrolysis of $(C_6H_5CO)_2CHCH_2CH(CN)_2$ by refluxing in aqueous HCl for 16 hours yielded a mixture of acids which were separated by steam distilling, which proved to be benzoic acid, and then recovering a non-volatile acid which was found to be gamma-benzoylbutyric acid. The latter melted at 128.5–129.5° C. It was converted to its semi-carbazone which melted at 210–210.5° C. with decomposition.

Acid hydrolysis of the cyclic disubstituted compound yielded benzoic acid and an acid which was only slightly soluble in chloroform. It had an M. P. of 137.5–138° C. On analysis the following results were obtained:

|  | C | H |
|---|---|---|
| Calculated for $C_{14}H_{16}O_5$ | 63.62 | 6.10 |
| Found | 63.68 | 6.25 |

The neutral equivalent was 131. On the basis of these data the structure of

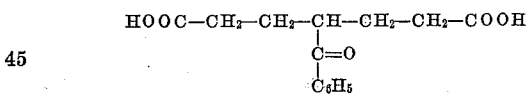

was assigned to the chloroform insoluble acid. Liquid diesters of this acid are useful as plasticizers for thermoplastic resins.

*Example IV*

To a solution of benzoyl acetone in dry chloroform containing solid $P_2O_5$ was added a solution of freshly distilled monomeric 1,1-dicyano ethylene in the same solvent. The molar proportions of each reactant was 1 to 1. The mixture was heated at reflux temperature until the odor of 1,1-dicyano ethylene was only slightly discernible. Colorless crystals in a yield of 45.8%, and having a melting point of 96.7–97.7° C. were recovered by distillation of the liquid diluent and recrystallization of the solid residue from alcohol containing activated carbon. Analysis showed that it contained 69.80% C, 4.95% H and 11.71% N as compared to calculated values of 69.98%, 5.04% and 11.66% respectively for the mono-1,1-dicyano ethyl substituted benzoyl acetone.

*Example V*

Ethyl benzoyl acetate was added to a reaction flask and heated to 100–110° C. Monomeric 1,1-dicyano ethylene was added slowly over about 20 minutes to the ethyl benzoyl acetate, in such quantity that the molar ratio of the ethyl benzoyl acetate was twice that of the monomeric 1,1-dicyano ethylene. Heating was continued for about two hours. Thereafter the excess ethyl benzoyl acetate was removed by distillation under reduced pressure. A 44.6% yield of a solid having a melting point of 77–78° C. was recovered.

The

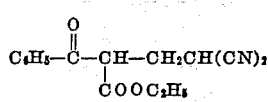

was analyzed and gave the following results:

|  | C | H | N |
|---|---|---|---|
| Calculated for $C_{15}H_{14}O_3N_2$ | 66.65 | 5.22 | 10.37 |
| Found | 66.50 | 5.12 | 10.30 |

On hydrolysis gamma-benzoylbutyric acid having a M. P. of 128.5–129.5° C. was recovered. This hydrolysis product was further identified by conversion to its semicarbazone.

In my copending application Serial No. 523,121, filed July 19, 1955, now Patent 2,804,469, I describe and claim methods of preparing other mono and bis 1,1-dicyano substituted active methylene compounds by reacting in the presence of an alkaline catalyst, a homopolymer of 1,1-dicyano ethylene with an active methylene compound having an ionization constant in water at 25° C. of at least $1 \times 10^{-17}$ together with the products which result from the reaction.

Although I have described this invention by reference to specific examples, they are intended for illustrative purposes only. Accordingly, this invention is intended to include all the variations and modifications falling within the spirit and scope of the claims. This application is a continuation of my patent application Serial No. 523,124, filed July 19, 1955, now abandoned.

I claim:

1. A method of preparing compounds having at least one —CH₂—CH(CN)₂ substituent in place of at least one hydrogen atom of a methylene group attached to two carbonyl carbon atoms comprising reacting a compound having a

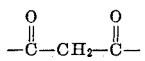

linkage as the sole functional linkage with monomeric 1,1-dicyano ethylene containing substantially no homopolymer thereof, in the absence of a catalyst.

2. A method of preparing compounds having the structure

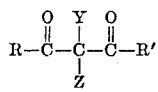

in which Y is hydrogen and when R and R' each is an aryl group Y also represents a 1,1-dicyano ethyl radical, Z represents a 1,1-dicyano ethyl radical, R is selected from the class consisting of alkyl, aryl, aralkyl and alkaryl hydrocarbon radicals and halogenated derivatives thereof and R' is selected from the class consisting of alkoxy, alkyl, aryl, alkaryl, and aralkyl radicals of from 1 to about 18 carbon atoms and halogenated derivatives thereof comprising reacting in the absence of a catalyst 1,1-dicyano ethylene with a 1,3-dicarbonyl compound having the generic formula

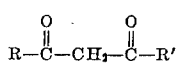

wherein R and R' have the same designation as above.

3. The method of claim 2 in which the reaction is carried out at an elevated temperature.

4. The method of claim 2 in which the 1,3-dicarbonyl compound is a 1,3-diketone.

5. The method of claim 2 in which the 1,3-dicarbonyl compound is a beta-keto carboxylic acid ester.

6. A method of preparing

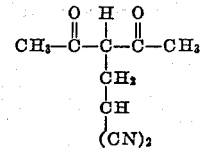

comprising reacting acetylacetone with monomeric 1,1-dicyano ethylene in the absence of a catalyst.

7. A method of preparing a mixture of

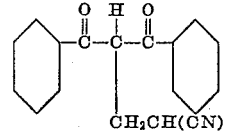

and

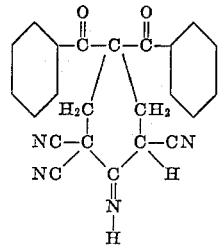

comprising reacting dibenzoyl methane with monomeric 1.1-dicyano ethylene in the absence of a catalyst.

8. A method of preparing

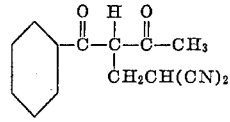

comprising reacting benzoyl acetone with monomeric 1,1-dicyano ethylene in the absence of a catalyst.

9. A method of preparing a compound having a 1,1-dicyano ethyl substituent in place of one active hydrogen in the methylene group of a saturated beta-keto propionic ester comprising reacting a saturated beta-keto propionic ester with monomeric 1,1-dicyano ethylene in the absence of a catalyst.

10. A method of preparing

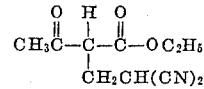

comprising reacting ethyl acetoacetate with monomeric 1,1-dicyano ethylene in the absence of a catalyst.

11. A method of preparing

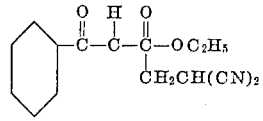

comprising reacting ethyl benzoylacetate with monomeric 1.1-dicyano ethylene in the absence of a catalyst.

12. Compounds having the structure

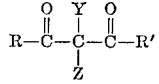

in which Y is hydrogen and when R and R' each is an aryl group Y also represents a 1,1-dicyano ethyl radical, Z represents a 1,1-dicyano ethyl radical, R is selected from the class consisting of alkyl group having from 1 to 18 carbon atoms, a phenyl group and a phenyl substituted lower alkyl group and R' is selected from the class consisting of alkoxy and alkyl groups having from 1 to 18 carbon atoms, a phenyl group, a phenyl substituted lower alkyl group and an arloweralkyl group.

13.

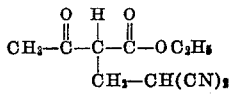

14.

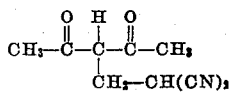

15.

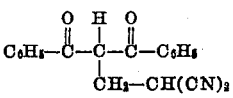

16.

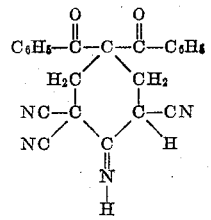

17.

$$C_6H_5-\overset{O}{\underset{}{C}}-\overset{H}{\underset{CH_2-CH(CN)_2}{C}}-COOC_2H_5$$

References Cited in the file of this patent

UNITED STATES PATENTS 2,804,469    Westfahl  --------------- Aug. 27, 1957

UNITED STATES PATENT OFFICE
Certificate of Correction

Patent No. 2,864,850                                                        December 16, 1958

Jerome C. Westfahl

It is hereby certified that error appears in the printed specification of the above numbered patent requiring correction and that the said Letters Patent should read as corrected below.

Column 4, lines 1 to 6, the formula should appear as shown below instead of as in the patent:

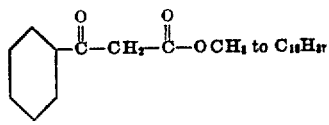

column 8, lines 58 to 63, the formula should appear as shown below instead of as in the patent:

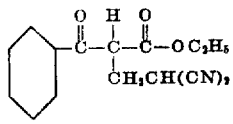

Signed and sealed this 5th day of May 1959.

[SEAL]

Attest:
KARL H. AXLINE,
*Attesting Officer.*

ROBERT C. WATSON,
*Commissioner of Patents.*